US008615863B1

(12) United States Patent
Hope

(10) Patent No.: US 8,615,863 B1
(45) Date of Patent: Dec. 31, 2013

(54) TOOL FOR INSERTING PLASTIC FLEXIBLE HOSE TO FITTINGS

(76) Inventor: Donald A. Hope, Loxahatchee, FL (US)

( * ) Notice: Subject to any disclaimer, the term of this patent is extended or adjusted under 35 U.S.C. 154(b) by 543 days.

(21) Appl. No.: 12/804,973

(22) Filed: Aug. 3, 2010

(51) Int. Cl.
*B23P 11/00* (2006.01)

(52) U.S. Cl.
USPC ................. 29/283.5; 29/255; 29/270; 29/278

(58) Field of Classification Search
USPC ................ 29/283.5, 255, 270, 278, 268, 276; 269/3, 6
See application file for complete search history.

(56) References Cited

U.S. PATENT DOCUMENTS

| | | | | |
|---|---|---|---|---|
| 5,887,328 | A * | 3/1999 | Rydin et al. | 29/259 |
| 6,279,432 | B1 * | 8/2001 | Osborn et al. | 81/383 |
| 7,398,584 | B2 * | 7/2008 | Katou | 29/252 |
| 7,617,580 | B2 * | 11/2009 | Ellis | 29/237 |
| 8,087,138 | B2 * | 1/2012 | Gupta | 29/270 |
| 8,286,954 | B2 * | 10/2012 | Zheng | 269/188 |

* cited by examiner

*Primary Examiner* — Lee D Wilson
(74) *Attorney, Agent, or Firm* — Norman Friedland; Ronald V. Davidge

(57) ABSTRACT

An insertion tool for inserting a fitting into a hose including a handle with a trigger parallelly disposed relative to an elongated translation rod movable in one direction including a fitting holder releasably mounted on the translation rod. A bell crank and linkage system connects the trigger to the translation rod for longitudinal movement and enhances the mechanical advantage to facilitate the insertion of the fitting into the hose. The hose holder is adjustable to accommodate different diameter hoses and the fitting holder can be changed to accommodate different shaped and sized fittings. The insertion tool can be used to insert the fitting into the hose while these units are in the ground or it can be oriented and changed to accommodate insertions at various attitudes. A knife is attached to the translation rod to allow the translation rod to be positioned to remove the hose from its fittings. A hose cutter is carried by the insertion tool and can be mounted on the translation rod to cut the length of the hose to a particular size.

16 Claims, 7 Drawing Sheets

FIG. 4
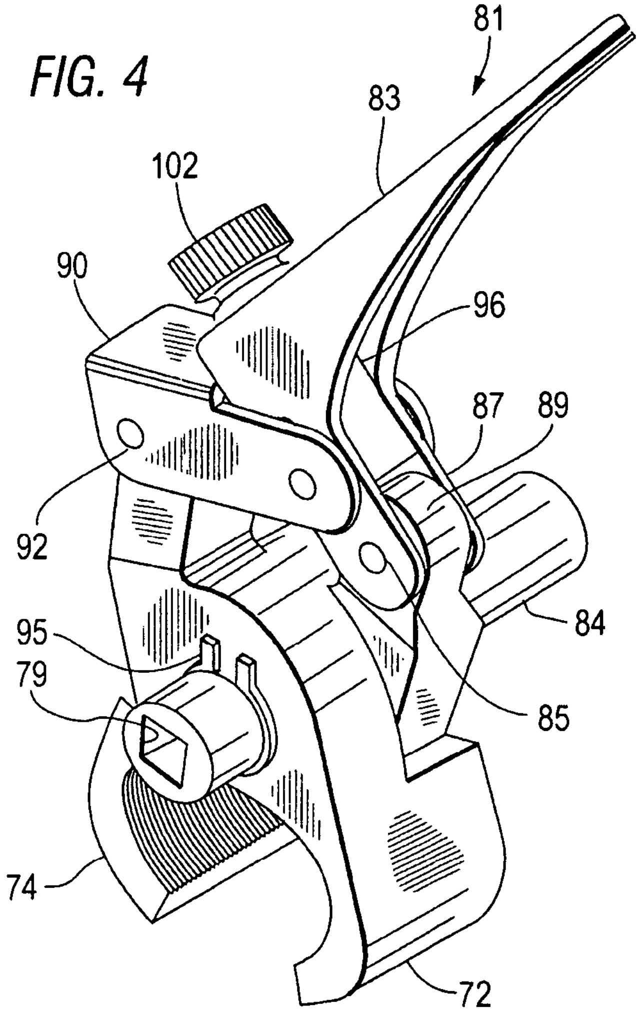
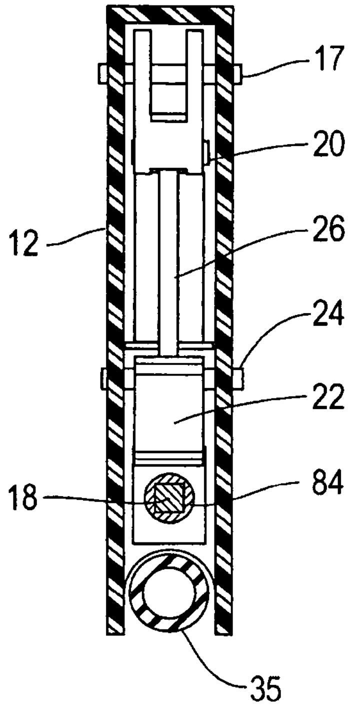
FIG. 5
FIG. 6

TOOL FOR INSERTING PLASTIC FLEXIBLE HOSE TO FITTINGS

RELATED APPLICATIONS

Not applicable

FEDERALLY SPONSORED RESEARCH OR DEVELOPMENT

Not applicable

TECHNICAL FIELD

This invention relates to a tool for inserting a barbed fitting into a flexible hose used in water, fluid or vacuum conveying systems and more particularly to the design of the tool that has universal functions such as the, ease for facilitating the insertion of a plastic fitting to a hose or a hose to a hose, ease of removal of the hose from the fitting, cutting means to cut the hose, funny pipe or PVC pipe from its fitting, means for operating the tool at different angles, for different size fittings and for different types of fittings. The tool is operable when the fitting is in the ground as for making the connection of these components when they are beneath the surface of the ground, for example, in a water sprinkling system; or above the ground and oriented at different angles and for garden hose to hose repair. This tool is also utilized to connect fittings to hoses utilized in other environments and in other applications, as for example, it is utilized to make connections of fittings and hoses in soda and beer dispensers and the like. This tool obviates the hand-insertion technique where the operator requires brute force to insert the hose directly onto the fitting. In other words, this tool has a built-in mechanical advantage which facilitates and reduces the amount of force that is necessary to make the types of connections alluded to in the above.

BACKGROUND OF THE INVENTION

As is well known in the irrigation art, in maintaining a landscape sprinkling system or installing a new system, the operator is required to either install irrigation components or to remove or replace the components that make up the plumbing system for flowing water while they are mounted beneath the surface of the ground or in difficult places to work on. Hence, the operator, for example, after digging beneath the surface of the earth, is required to make a connection between the fittings and the fluid conveying systems that typically include plastic tubing (sometimes referred to as pipe or PVC pipe or funny hose or flexible PVC Pipe). Typically, the installation of the in-ground sprinkler system is done by hand where the operator encounters numerous designs of barbed fittings that make up a plumbing system for connecting the sprinklers to the plastic pipes or hoses. For example, these fittings include barbed funny pipe, T-connector fittings, male and female elbow fittings, barbed male and female adapter hose couplings, hose connectors, fittings directly connecting the sprinkler, hose-to-hose fittings etc. Without a tool, the operator through brute force forces the end of the hose onto the barb of the fitting. It isn't difficult to see that this is a tiring and time consuming operation particularly where there are numerous fittings that need to be connected.

Also well known in the water sprinkler technology, the installation typically requires many operations that the installer must perform in addition to installing the hose or PVC pipes to various types and sizes of fittings, which include amongst others, the cutting of the hose or PVC pipe and removing the hose from the fitting. Typically, the installer must carry separate tools to accomplish these operations. In accordance with this invention, not only does the tool of this invention provide ease for installing the hose, it also allows the operator to adapt the tool to be used on different size fittings and at different angles below and above the ground surface, it allows the operator to remove the hose or PVC pipe from a fitting and has a hose cutting feature as will be more fully described herein below.

In a complex in-ground sprinkler system it is typical to components made from various materials such as fittings that serve to connect the pipes to the sprinklers, to the water source and pipes to pipes. As is well known some of the materials used for these parts are made from commercially available plastic material which is relatively rigid and hard. Obviously, the resilience and toughness of the pipe and the dimensions of their inner and outer diameters play a paramount role in how easy or hard it is to install the pipe to the fitting or the fitting to the pipe, etc. As mentioned above, this invention addresses the insertion problem by providing a tool with a predetermined mechanical advantage that enables the installer to install the hose onto the barbed fitting with relative ease. In heretofore known installations, the installer would use a lubricant on the end of the hose to assist in the insertion of the hose to the fitting. The tool of this invention, as will be described in detail herein below, serves to alleviate the difficult tasks of inserting commercially available barbed fittings onto their commercially available pipes or hoses, Not only is this inventive tool capable of making installations beneath the surface of the ground and above ground, it can be employed for other applications, as for soda dispensers and the like. It is well known that the installation of these components requires that a lubrication be applied to end of the component being inserted. An advantage of the present invention is that there is no need to apply such lubrication.

There are a number of tools that are designed for the purpose of inserting the hose onto their fittings that are disclosed in the literature. As for example, U.S. Pat. No. 6,658,711 granted to Benson on Dec. 9, 2003 describes an insertion tool that releaseably supports a hose and a pistol type of translating device urges the hose onto the fitting. Several disadvantages are noted with this particular tool. First, the insertion of the hose to the fitting can only be done above the ground and hence, does not allow the insertion of the hose where the fitting and/or hose are buried beneath the surface of the earth as is the case in installed water sprinkler systems. Second, the hose is moved onto the fitting and this has the propensity of allowing the flexible hose to bend and hence, interfere with the installation procedure. And, third, the method of holding the fitting in place is either by frictional fit to a flat plate or as suggested, but not described, by a conical shape that would protrude into a hollow fitting. While not limited thereto, the present invention allows the installation of a barbed fitting, elbow or adapter to a hose when in the ground, inserts the fitting into the channel of the hose while it is supported by this inventive tool so that the hose cannot bend when the tool is being deployed. Unlike the referenced patent, the present invention doesn't require a soap or alcohol lubricant to start the installation process. As will be described below, the present invention is characterized by having a relatively large mechanical advantage, facilitating the installation of the hose or PVC pipe to the fitting.

Another patent that describes an insertion tool for inserting a fitting into a hose is U.S. Pat. No. 5,979,032 that uses a grip-vise type of hose holder and a pivoting arm that includes a semi-spherical fitting holder that is aligned with the grip-vise hose holder at one position for inserting the fitting into the hose. The pivotal motion used to translate the fitting into the hose has been found to be an undesirable action for a tool that is adapted to insert a fitting into a flexible hose since the motion is arc like as opposed to being axial. Like the structure in the '711 patent, supra, this tool cannot accommodate an insertion of the fitting to the hose when the fitting and/or hose is beneath the surface of the ground. And furthermore, the structure of the '032 patent is limited to barbed adapter fittings.

U.S. Pat. No. 4,408,381 granted to Kish on Oct. 11, 1983 and U.S. Pat. No. 5,075,945 granted to Yeargin on Dec. 31, 1991 are other examples of tools that are used to insert hoses onto fittings and are mentioned here because they are used for other environments other than water sprinkler systems and cannot be adapted for in-ground insertion of the hose to fitting or vice versa. In contrast, the present invention, not only has the ability to allow the insertion of fittings to hoses, it can also be used for other environments, as for example inserting the hoses into soda and beer dispensers and the like.

Not only the heretofore known tools deficient in the mechanical advantage exhibited by the present invention, they have the disadvantage of not being capable of handling more than one size and or one type of fitting, nor can they be utilized when the fitting is in the ground. Additionally, the prior art type of insertion tool requires a number of other types of tools to provide the operations that are necessary for the installer, in contrast to the present invention which can be done with the use of single tool of the present invention.

SUMMARY OF THE INVENTION

An object of this invention is to provide a tool for inserting a barbed fitting onto a hose that is characterized as being capable of use beneath the surface of the ground as is required in a water sprinkling system. It also has the flexibility to be used at different attitudes and angles, as, for example, where the fitting is against a building, A feature of this invention is a tool for installing a fitting onto a hose fitting and the tool is characterized as having a removable fitting holder that accommodates different types and sizes of fittings.

A feature of this invention is a tool for inserting a fitting to a hose that is characterized as being adjustable to accommodate hoses that have different diameter dimensions.

A feature of this invention is a tool for inserting a fitting onto a hose that is characterized as having mechanism to assure that the hose and fitting are aligned before installing the hose onto the fitting.

A feature of this invention is a tool that includes a removable hose locking mechanism that is identical to the hose locking mechanism on said tool that locks opposing hoses that are inserted into a fitting so as to connect two separate hoses.

A feature of this invention is an insertion tool as described including a handle with a trigger that is mounted parallel to the translating bar and the hose and fitting holders.

A feature of this invention is the positioning of the trigger pivot in the tool relative to the actuation arm to obtain a mechanical advantage that permits the easy installation of the fitting to the hose or PVC pipe.

A feature of this invention is the provision of a release button that allows the reciprocal translation of the movable fitting holder.

Another feature of this invention is a hose cutting tool adapted to be used to cut the hose.

Another feature of this invention is a hose removal tool on said tool that allows the operator to remove a hose from its fitting.

The foregoing and other features of the present invention will become more apparent from the following description and accompanying drawings.

BRIEF DESCRIPTION OF THE DRAWINGS

FIG. 4 is a perspective view of the assembly of the hose clamping mechanism of depicted in FIG. 3 and is shown in the opened position;

FIG. 5 is a sectional view taken along lines 5-5—of FIG. 1.

FIG. 6 is an end view in elevation illustrating one of the jaws of the hose clamping mechanism depicted in FIG. 3;

DETAILED DESCRIPTION OF THE INVENTION

While this invention in its preferred embodiments describe a fitting insertion tool for a number of different sizes and types of fittings and different diameter hoses or PVC pipes (hereinafter referred to as hoses), as one skilled in this art will appreciate this invention can be utilized with a host of other fitting designs without departing from the scope of this invention. In each configuration, the intent of this invention is to provide a tool that can be used by an operator to insert the fitting into the hose as opposed to inserting the hose onto the fitting or inserting the hose/fitting by hand only. As will be understood by those skilled in this technology, while this tool is being described as being capable of installing a fitting to a hose when one or both are beneath the surface of the ground, this invention can be used for the installation process of hoses and fittings while the tool is being held in all attitudes, as above the ground, vertically, horizontally or the like.

Figure 1:
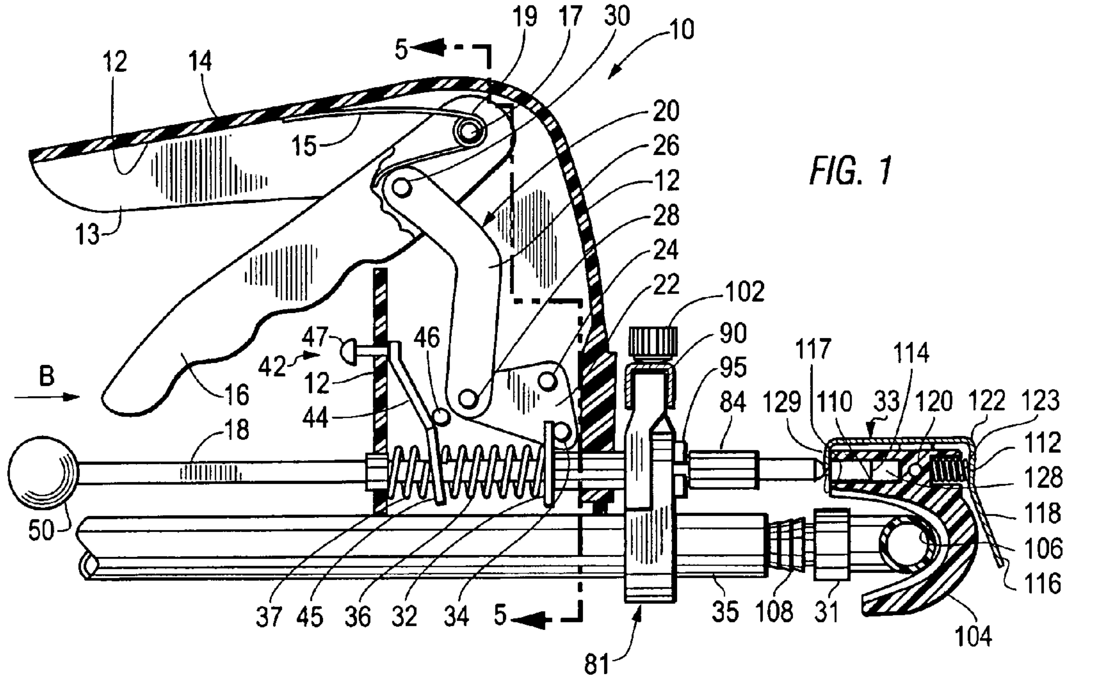
FIG. 1 is a cut-a-way view in section and elevation of the tool of this invention for inserting a conventional fitting to a conventional hose used in a lawn sprinkler system and illustrating the removable fitting holder to allow the operator to change the holder for different sized fittings.
Figure 2:
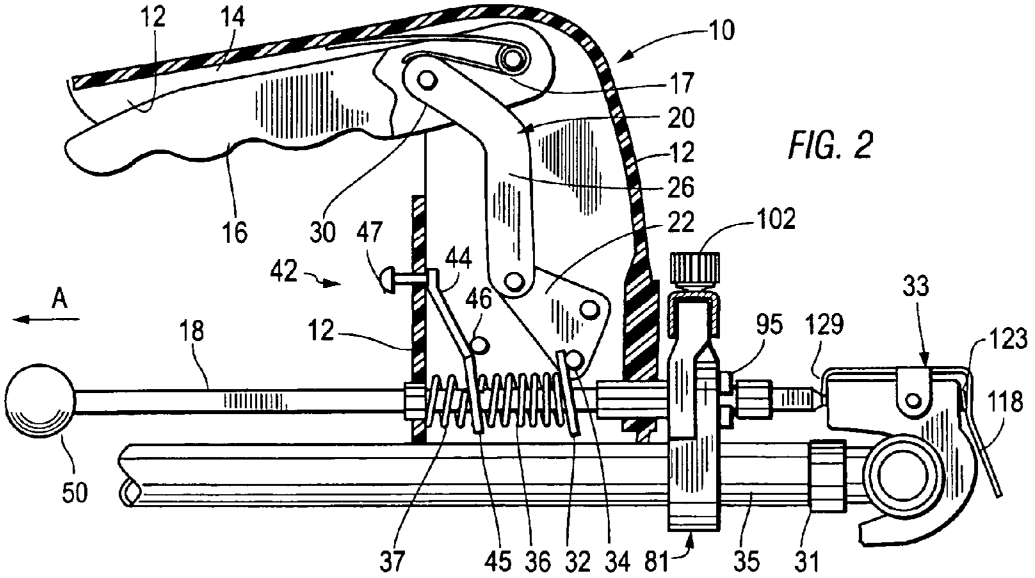
FIG. 2 is identical to the tool depicted in FIG. 1 illustrating the tool of this invention with the fitting in the actuation process after being inserted into the hose.

Referring to FIGS. 1, 2 and 5 which best show the hose insertion tool, broken away to show the inner working parts, which is generally illustrated by reference numeral 10 having a main housing 12 configured to include an L-shape handle 14 with one leg 13 pivotally supporting trigger 16 by virtue of the pivot pin 17. A V-shaped leaf spring 15 having the coiled portion 19 mounted around pivot 17 and having one end mounted under and bearing against the inner surface of the handle 14 and the other end bearing against the trigger, biasing handle 14 and trigger 16 in the spaced position. Obviously squeezing the handle causes the inner working members to operate the tool 10. As can be seen in the drawing, the handle is disposed in a parallel position relative to the translating rod 18 that serves to enhance the versatility of the tool and will be described in detail herein below.

The connecting linkage of the tool 10 generally illustrated by reference numeral 20 serves to move the translation rod 18 in an axial direction by virtue of squeezing trigger 16 which causes the translation rod to move in the direction to insert a fitting 31 onto hose or PVC pipe 35. Connecting link 20 comprises bell crank 22, interconnecting link 26 and actuation lever 32. One end of bell crank 22 is pivotally mounted to housing 12 by virtue of the pivot pin 24. One end of the interconnecting link 26 is pivotally attached to the trigger 16 by virtue of the pivot pin 30 and the other end of interconnecting link 26 is pivotally attached to one end of bell crank by virtue of pivot pin 28. Actuation lever 32 which is slideably mounted on longitudinal translation rod 18 bears against protruding pin 34 on one end and on the coil spring 36 which surrounds the longitudinal translation rod 18. As can be seen in FIG. 1 actuation lever 32 is disposed perpendicular to translating rod 18. Also, it will be noted that the pivot pin 30 and pivot pin 28 are axially spaced from each other as is pin 34 and the pivot pin 24. Pivot pin 24 is disposed between the pivot pin 28 and pin 34. This arrangement provides a significant mechanical advantage and it was found in actual tests, that inserting a fitting into a hose was relatively easy. It is also noted that one end of coil spring 36 bears against the release lever 44 supported to housing 12, as will be described herein below.

In operation and as shown in FIG. 2, squeezing the trigger 16 causes the interconnecting link 26 to move in the upward direction which causes the bell crank 22 to pivot about pivot pin 24 and drives pin 34 rearward (toward the left hand as viewed in FIG. 2) and in direction of arrow A. This causes two things to happen; firstly, actuation disk lever 32 is cocked from the perpendicular position into an angular position forcing an edge of inner diameter of disk 32 to bite into translating rod 18 and secondly, this causes the disk 32 to move the translation rod 18 whereby causing translation rod 18 to move in the direction of arrow A, while at handle 14 and the same time compressing spring 36. When trigger 16 is released spring 15 causes the trigger 16 and handle 14 to move apart and return back to the original position while spring 36 causes disk 32 to return back to its original perpendicular position. Obviously, the fitting holder 33 holds the fitting 31 in place as it is being drawn into the end of hose 35. Once, the fitting is installed, the operator will unclamp the hose and remove the insertion tool, as will be described in greater detail herein below. Because handle 14 and translation rod 18 are parallel to each other and parallel to the hose, it will be appreciated that this arrangement of these parts just described allows the operator to insert a fitting into the hose when they are in the ground. This is simply one of the many options that the user has with this invention; the operator can use the tool where the installation is at different attitudes.

The release mechanism generally illustrated by reference numeral 42 as best seen in FIGS. 1 and 2 serves to allow the user to return the translation rod 18 back to the original position and releasing the fitting after it is installed in the hose or otherwise, selecting any desired position at the beginning of the operation cycle. To return the translation rod to the original position, i.e. in the direction of arrow B, the following occurs. The release lever 44 carrying the disk 45, similar to the disk or actuation lever 32, is normally held in a cocked position by the end of spring 37. When release lever 44 is actuated by the push button 47 the release lever 45, via release lever 44 pivoting about pin 46, is placed in a vertical position and frees itself from translation rod 18 i.e. it does not bear against the translation rod 18. Since the inner portion of disk 45 isn't biting into translating rod 18, by pushing on ball 50 mounted on the end of translating rod 18, the translation rod 18 is free to move in the direction depicted by arrow B and can now be moved rectilinearly to its initial position or a new position as noted in the above paragraph. As noted spring 37 disposed between housing 12 and disk 45 serves to return lever 44 to its original position and hold the disk 45 in the corked or angular position. Obviously, when the disk 32 is biting and disk 45 is not, the translation lever 18 can be moved in only one direction and vice versa. Save for the linkage connections and the significant mechanical advantage obtained thereby and the various locations of the components of the present invention, the driving mechanism used to move the translating rod in both axial directions is similar in function to the mechanism that is commercially available in a caulking gun.

Figure 3:
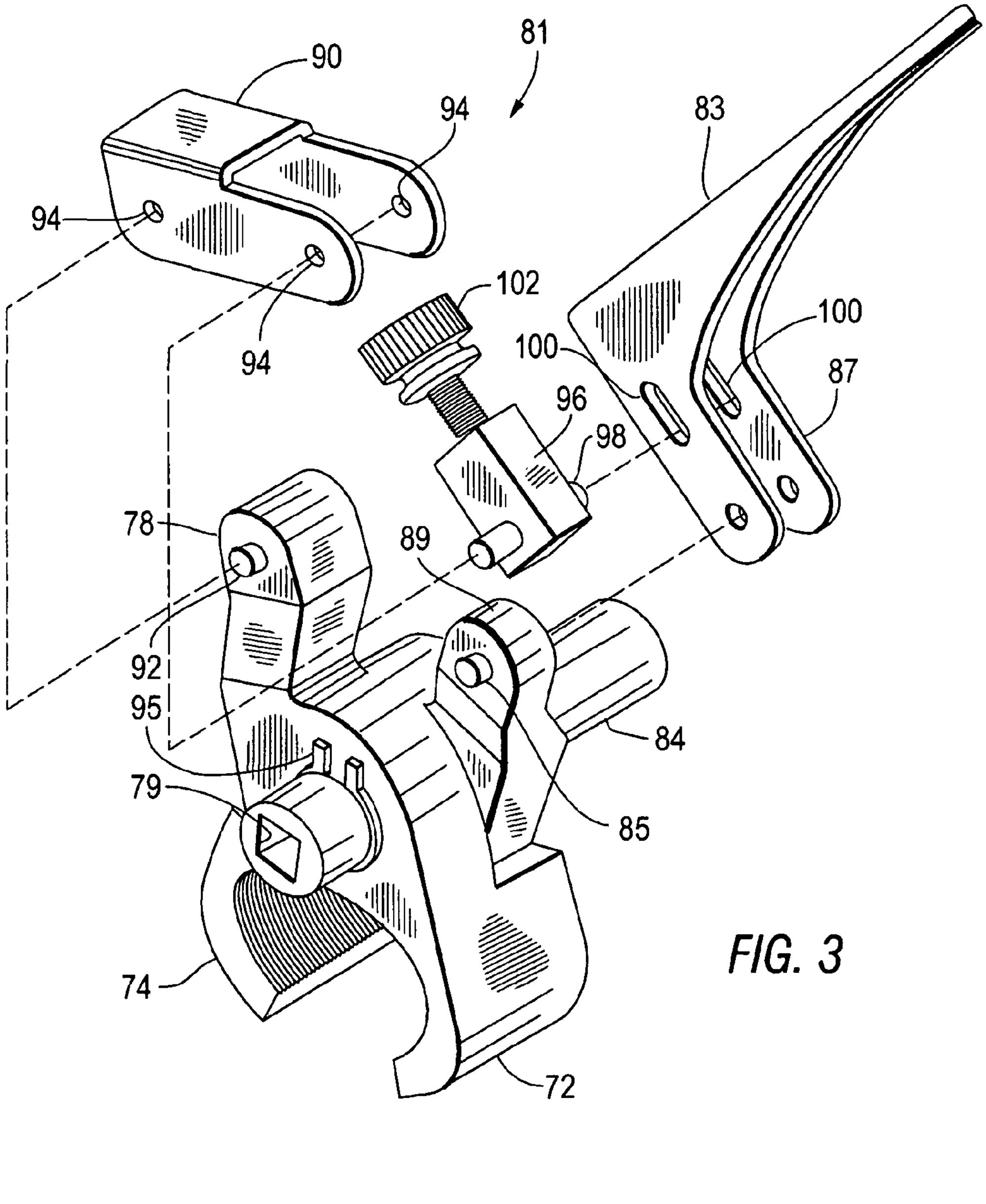
FIG. 3 is an exploded view in perspective of the hose clamping mechanism of the tool of this invention depicted in FIG. 1.
Figure 7:
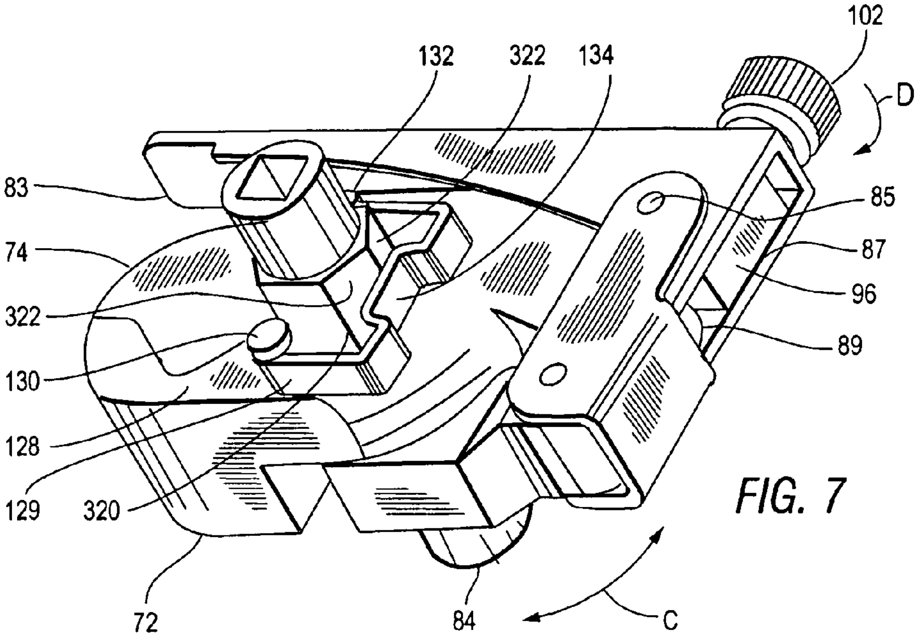
FIG. 7 is a perspective view illustrating the tool of this invention as being capable of used for different attitudes such as inserting a fitting to a hose when in the ground or adjacent to a building.

The next portion of this description as illustrated in FIGS. 3, 4 and 7 details the hose clamping mechanism generally illustrated by reference numeral 81 that serves to hold the hose in alignment with the fitting that is intended to be united to each other. The hose clamping mechanism 81 is mounted on the translation rod 18 by the stub shaft 84 via the through bore 79 that is square shaped in cross section to complement the shape of translation rod 18. The snap ring 95 locks the hose clamping mechanism 81 in place. (Obviously, the shape of the translation rod and the stub shaft bore can have different shapes without departing from the scope of this invention) The scissor-like jaws 72 and 74 are pivotally mounted to stub shaft 84 and serve to clamp the hose. The size of the opening between the jaws is changeable to accommodate different sized hose diameters as will be explained in more detail herein below. Actuating handle 83 is pivotally connected by pin 85 at the bifurcated end portion 87 which straddles the smaller thickness portion 89 of the jaw 74. The other jaw 72 is connected at the thinner portion 78 of jaw 72 to the bifurcated clamp 90 via the pin 92 extending through the opposing holes 94 (only one being shown). Mounted between the bifurcated end portions of lever 83 is plug 96 carries at one end pin 98. Pin 98, in turn, fits into elongated parallel slots 100 mounted in the arms of the bifurcated end portion 87. Screw member 102 extending through an opening in the top of lever 83 is threaded to the threads formed internally at the end of plug 96 located opposite to the pin 98. Screw member 102 turns freely in the lever 83 and threads into the female threads formed on the top end of plug 96. Rotating screw member 102 in the direction depicted by arrow D causes the plug 96 to move axially and change the relative position of the jaws 72 and 74 to change the opening there-between in order to accommodate different sized hoses or PVC pipes. As an option, the outer end of stub shaft 84 may be marked with indicia to indicate where the hose should extend during the start-up when different sized hoses and fittings are used.

Figure 9:
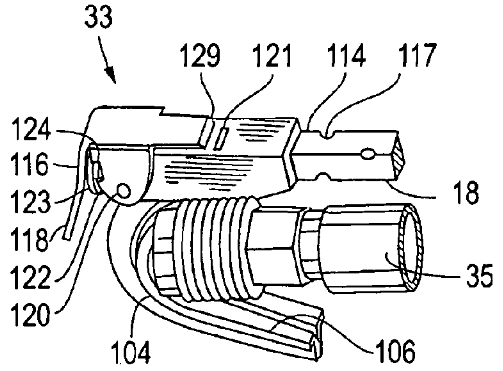
FIG. 9 is a fragmentary view in perspective illustrating the removable fitting holder and exploded to illustrate the rod end connector that fits into the end of the removable fitting holder.

This portion of the description as best seen in FIGS. 1, 2, 9 and 10 will describe the details of the fitting holder mechanism generally illustrated as reference numeral 33 which is releasably attached to the end of translating rod 18. Fitting holder 33 comprises a main body 104 that is configured in the shape of a U or C and is sized to accept a particular sized barbed fitting 31 which is, in this example, an elbow barbed fitting shown as an example in FIGS. 1 and 2. Obviously, other types of barbed fittings may be accommodated by this invention. The concaved portion 106 of main body 104 faces the end of the hose 35, shown as an example, and the barb 108 of fitting 31 is oriented in axial alignment to fit into the end of hose 35 or a PVC pipe (not shown). The upper end portion 110 includes a partial bore 128 adapted to accept the end 114 of the translating rod 18. The opposite end of the main body 104 includes a pivotal member or pawl 116 defining a lever arm 118 supported for pivotal movement by pin 120. as shown in FIGS. 1 and 2 lever arm 118 is spring loaded by spring 122 that fits into recess 124 and bears against a face of the lever arm 118. As seen in FIGS. 1 and 2 lever arm 118 is bent downwards at both ends where one end 112 serves as a push lever and the other end serves as a projection or tab 129 that fits through slot 123 into an annular groove 117 formed on the end of translating rod 18. The tab 129 that fits into the annular groove 117 serves to lock the fitting holder 33 in place. In FIG. 1, the spring 123 disposed in the recess 124 formed at the end of main body member 104 bears against the surface of lever arm 118 and biases the lever arm 118 outwardly so as to keep the tab 129 into the annular groove 117. Depressing the lever arm 118 causes the lever arm to pivot about pin 120 so as to lift up and disengage the translating rod 18. In FIGS. 1 & 2 the tab 129 is disposed at the end (instead of intermediate the ends as is shown in FIG. 9) of the main body 104 and fits into annular groove 117 formed in translating rod 18. As is apparent from the foregoing the locking mechanism described in FIGS. 1 and 9 serves to lock the fitting holder 33 in place. This design introduces flexibility in the tool as it can be adapted to change the fitting holder 33 to accommodate different sized and shaped barbed fittings. Obviously, other locking mechanisms are contemplated by this invention.

Figure 13:
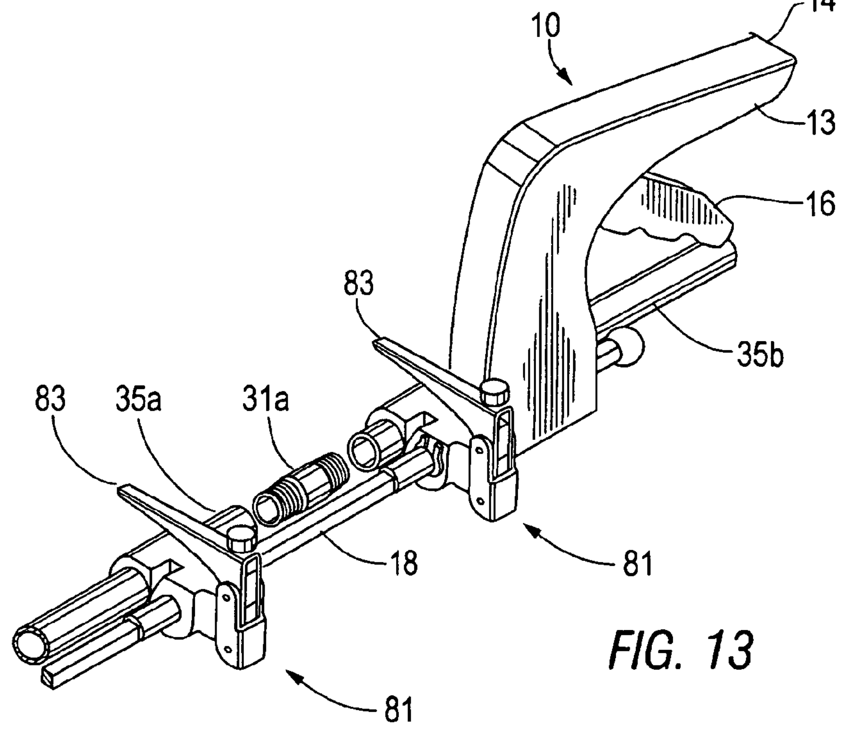
FIG. 13 is a view in perspective and schematic illustrating where the tool of this invention can utilize an additional hose clamping device to attach two hoses to a fitting.

FIG. 13 is exemplary of another embodiment of this invention where it is desired to attach two hoses together using a standard off-the-shelf fitting. The hose insertion tool 10, exemplified in FIGS. 1, 2 and 5 is utilized to clamp two hoses together. To this end, a second hose clamping mechanism 81 (like reference numerals relate to the same or similar parts) serves to hold two hoses 35*a* and 35*b* in axial alignment with each other and the translation of translation rod 18 actuated by squeezing trigger 16 relative to handle 14 serve to connect hoses 35*a* and 35*b* to the barbed coupling 31*a*. The operation of the hose clamping mechanism 81 and the operation of the hose insertion tool 10 are identical to the operation of these parts as described with the other embodiments depicted in the other Figs. In operation, the operator would likely partially insert the barbed coupling to the ends of both hoses and then mount the hoses into the clamping mechanism and then actuate the trigger to move the translating rod 18 to force the hoses onto the fitting 31*a*. To prevent the hose locking member 81 that is used to hold hose 35*a* from slipping, it is contemplated in accordance with this invention to utilize the locking mechanism that is described in connection with FIGS. 1 and 2. Obviously, other design could also be used without departing from the scope of this invention.

FIG. 7 exemplifies a still another embodiment of this invention where it is desirable to orient the hose insertion tool 10 in different attitudes. In FIG. 1 for example, the hose insertion tool is operable to insert a hose or fitting where these units are on or below ground level, such as would be the case for an in ground water sprinkling system. To accomplish this task, this invention contemplates allowing the hose clamping mechanism 81 to rotate around the stub shaft 84. The stub shaft 84 is modified to include the annular portion 320 extending around the periphery of this shaft having flats 322 formed on opposing sides thereof. Spring 129, generally shaped in the form of a W or M, is suitably attached to the face 128 of the jaw 72 by pins 130 and 132. The depending portion 134 located in the middle of the spring 129 carries a flat portion that engages the flat 322 formed on the annular portion 320. After the hose clamping mechanism is rotated as shown by the arrow C, the spring 129 holds it into place.

Figure 10:
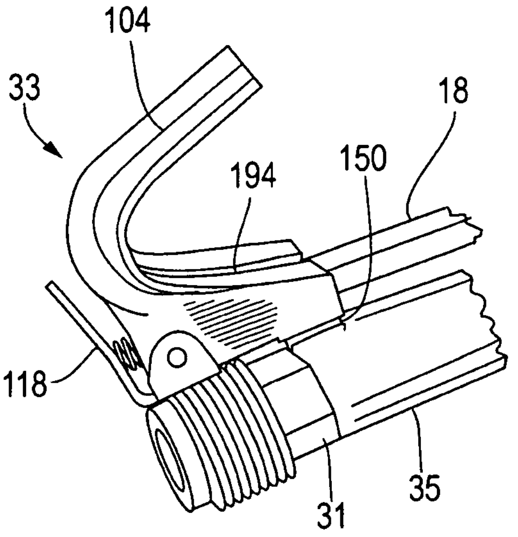
FIG. 10 is a perspective view illustrating an option available with the hose insertion gun of this invention that includes a cutter for removing a hose attached to a fitting.

FIG. 10 exemplifies an option available with the hose insertion tool and it is a cutting blade 150 judiciously attached to fitting holder 33. The fitting holder 33 is attached to translating rod 18 so that actuation of the translation rod 18 serves move the cutting blade 150 toward the end of hose 35. Continuing this movement causes the cutting blade to slit the end of the hose freeing it from the barbed fitting 31. In other words, the cutting blade 150 by cutting the hose allows the operator to remove the hose 35 from its fitting. As is apparent from FIG. 10, the cutter 150 is suitably attached to the surface of the main body 104 adjacent to the lever 118. In operation, the fitting/hose insertion tool 10 and the fitting holder 33 are installed on the hose insertion device 10 as described in connection with the other Figs. Cutter 150 defines a knife edge that when the fitting holder 33 is drawn toward the hose 35 the knife fits under the hose inner wall and over the outer surface of fitting 31. As was described in the above, the knife edge slides under the end of the hose, cuts into the hose 35 and frees it from the fitting.

Figure 8:
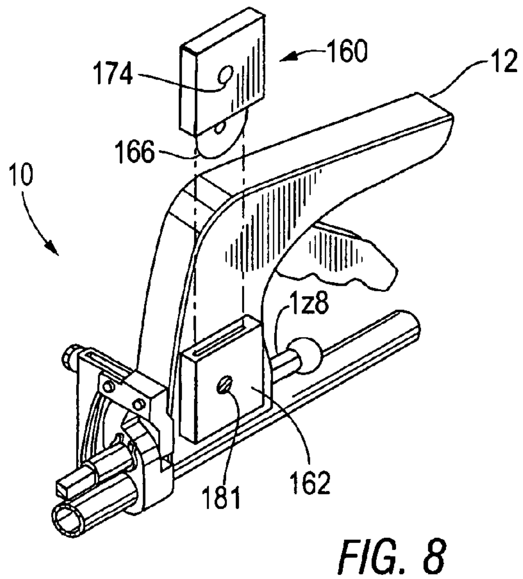
FIG. 8 is a fragmentary exploded and perspective view illustrating a storage pocket for housing the cutter.
Figure 11:
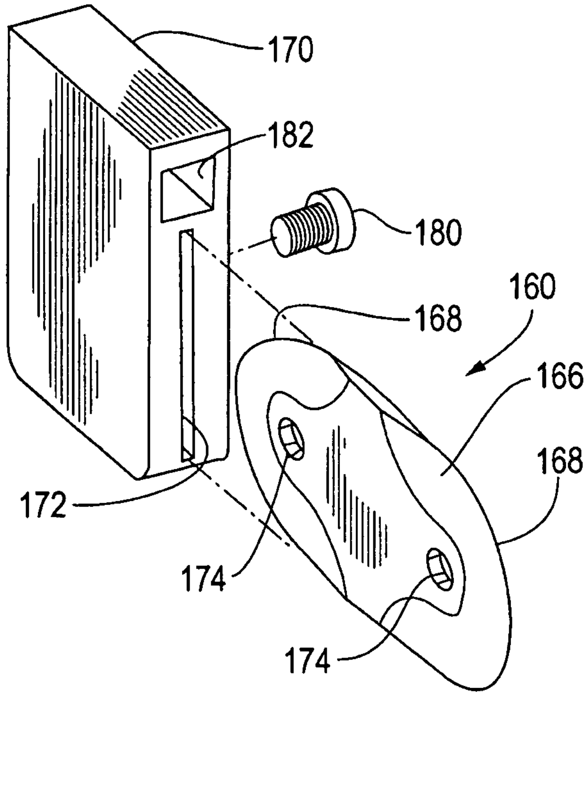
FIG. 11 is an exploded view in perspective illustrating the details of the hose cutter.
Figure 12:
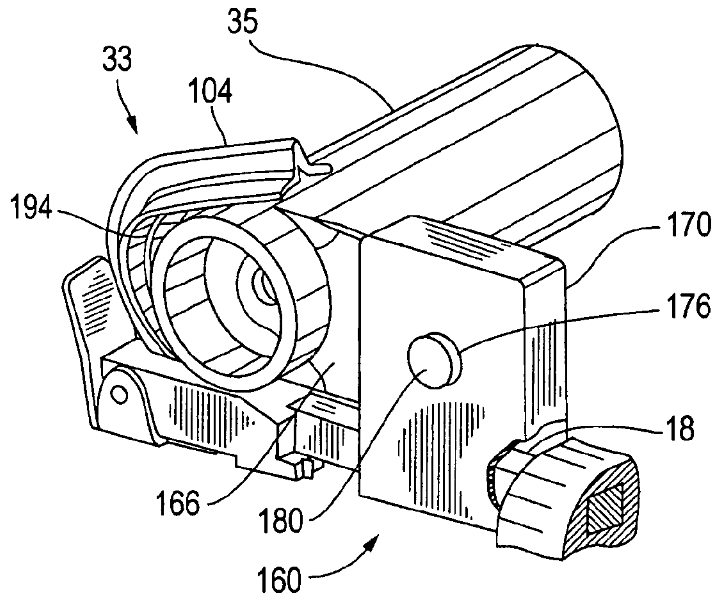
FIG. 12 is a fragmentary view in perspective illustrating the hose cutter mounted to the tool and partially cutting through a hose or PVC pipe.

FIGS. 8, 11 and 12 exemplify another option of the present inventive tool. As is well known the installation and repair of sprinkler systems typically require that the hose or PVC pipe be cut to a particular size. The cutter generally illustrated by reference numeral 160 is carried with the tool in say, pocket 162 suitably mounted on the side surface of housing 12 and a screw 181 holds the cutter in place when not in use (FIG. 8). The cutter includes a knife edged disc 166 having a pair of cutting edges 168 formed on either end, where one of the edges is used during a cutting operation and the other is used as a spare. The cutter 160 is supported in the base member 170 that includes a slot 172 dimensioned to receive cutter 166. The holes 174 selectively align with a hole 176 formed on the side face of base member 170 and when in use the screw 180 is screwed into threads formed in said hole 176 and serves to support blade 168 to base member 170. Slot 182 is sized to fit onto the translating rod 18. In operation the fitting holder 33 is mounted to the translating rod 18 and when moved toward the hose clamping mechanism 81 the knife edge cuts into the hose or PVC pipe and ends up against the inner surface of the main body 104 which includes a C-shaped groove 194 to accommodate the end of the cutting edge after it cuts through the hose. C-shaped groove 194 is formed adjacent to the translation rod 18 on the side facing the hose holder 81. This provides a space to receive the end of the cutting edge 168 of cutter 160 and prevent injury thereto. As is apparent from the foregoing and as shown in FIG. 12, the insertion tool is used in the example disclosed in this application to cut through hose 35 attached to the hose holder 33 which includes the curved groove 194 formed on the inner surface of the hose holder 33 and conforms in shape to the edge 168 and also serves to assure that the edge 168 of the knife edge disk 166 passes through the hose 35.

Figure 14:
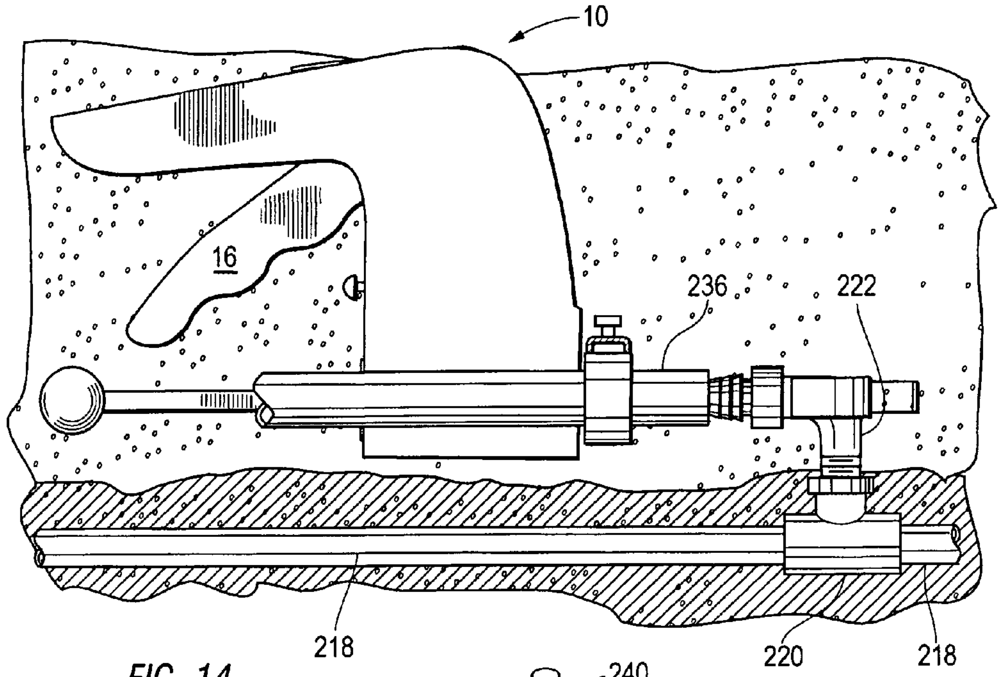
FIG. 14 is a schematic and prospective view of the tool in operation to insert a hose into the fitting, in situ, in the ground.
Figure 15:
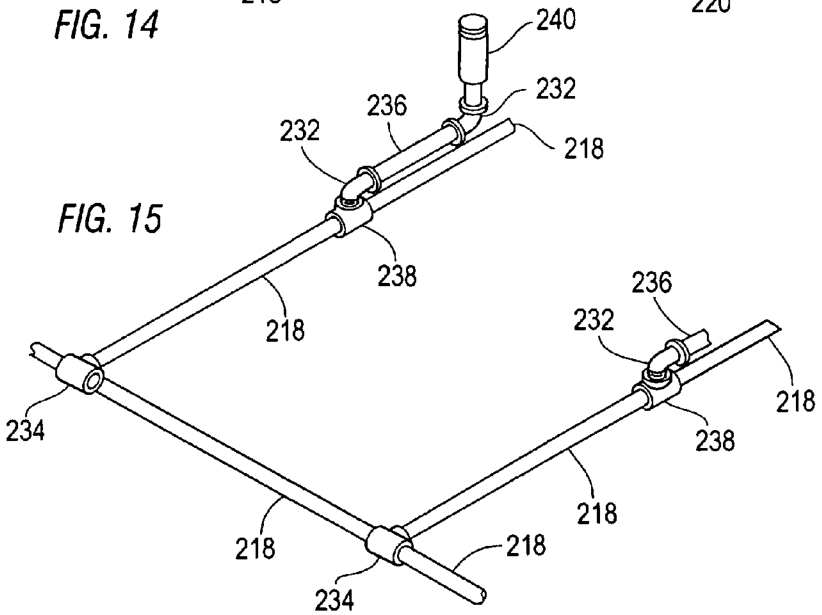
FIG. 15 is a schematic view partly in prospective illustrating a partial in-ground sprinkler system.

FIGS. 14 and 15 are prospective and schematic views of the invention as applied to an in-ground sprinkler system and illustrates how this invention can be utilized in attaching a hose or a fitting while the sprinkler system and the component parts remain beneath the surface of the ground. As noted in FIG. 14, the funny hose 236 is connected to the PVC fitting 220 via the barbed funny pipe elbow 222 located underneath the surface of the ground. In this example the barbed funny pipe elbow 222 is being attached to the hose 236 by the insertion tool 10 (see FIGS. 1 and 2). In this operation, the installer will attach the hose 236 to the funny pipe elbow 222 by attaching tool 10 to the hose 3 as described in the above paragraphs and align the hose 236 with the end of funny pipe elbow (fitting) 222 and then squeeze on trigger 16 until the hose 236 is inserted onto the fitting 222.

FIG. 15 schematically illustrate typical in-ground system comprising an in-ground sprinkler system comprising a PVC pipe 218 and fittings 234 showing how the system is oriented to form a pattern consistent with the landscape being watered. This system illustrates the PVC pipe being connected via T-fittings via PVC fitting 234 are the other PVC pipes 218 and, in turn, to the funny hose 236 via fitting 238 and barbed funny elbow 232. The funny hose 236, in turn, is attached to the sprinkler 240 via the barbed funny elbow 232. It is apparent from the foregoing, and as understood in this industry, the operator having to replace a sprinkler had to heretofore dig up the sprinkler by digging sufficient ground surrounding the sprinkler, lift it above ground and perform the necessary repair above ground, and then return it to the proper position. With the advent of the present invention, these tasks can be done beneath the surface of the ground after a small amount of dirt from the ground has been removed to accommodate the insertion of the tool being placed into the ground.

What has been shown by this invention is a hose insertion tool that includes a handle and trigger with a unique lever arm connection with a unique mechanical advantage that eases the assembly of barbed fittings to hoses. Obviously, in other applications, the fittings need not be the barbed type. The judicious location of the pivot points 30 and 28 so that the pin 34 is off-center and spaced right thereof relative to pin 24 and the judicious position of handle 14 and trigger 16 provide a mechanical advantage that enhances the ease of forcing the fitting into the hose. Test conducted have proven that the insertion is relatively easy. Additionally, the invention can be used for inserting fittings to hoses in all attitudes and includes cutting utensils that allow for the cutting of hoses or PVC pipes to size and for the removal of hoses from its fittings. The hose clamping mechanism is unique in that it is adjustable to accommodate different sized hose diameters. The fitting holder serves to hold the many different sized and shaped fittings, like elbow, or t-shaped and the like. Obviously, the design of the fitting holding mechanism enhances the flexibility of the tool in general. As shown, hose-to-hose connection is an option that is available by virtue of this tool.

Although this invention has been shown and described with respect to detailed embodiments thereof, it will be appreciated and understood by those skilled in the art that various changes in form and detail thereof may be made without departing from the spirit and scope of the disclosed invention.

It is claimed:

1. An insertion tool for inserting a fitting to a hose comprising a main housing having a handle and a translating rod oriented in parallel relationship, a trigger pivotally attached to said handle, a spring between said handle and said trigger biasing said trigger away from said handle, a bell crank mounted in said main housing and pivoted at one end by a pivot thereto, a connecting link having one end pivotally connected to said trigger by a second pivot and the opposing end pivotally connected to one end of said bell crank by a third pivot, a pin mounted on another end of said bell crank, an actuator lever operatively connected to said translating rod and said pin for translating said translating rod in a first direction, a hose holder, comprising a pair of scissor mounted jaws, attached to said housing and adapted to support a hose, a lever operatively connected to said jaws for opening and closing said jaws and locking them in place, a set screw mounted on said handle, a plug mounted adjacent to said handle and connected to said set screw for positioning said plug relative to said handle for changing the opening size of said jaws to accommodate different size hoses, a fitting holder attached to said translating rod and being oriented to be in line with said hose wherein operation of said trigger causes said translating rod and said fitting holder to position said fitting into said hose, and wherein said first pivot is disposed between said second pivot and said pin whereby said mechanical advantage is enhanced and said insertion tool is operable to insert a fitting into a hose when said hose is disposed in the ground.

2. An insertion tool for inserting a fitting to a hose comprising a main housing having a handle and a translating rod oriented in parallel relationship, a trigger pivotally attached to said handle, a spring between said handle and said trigger biasing said trigger away from said handle, a bell crank mounted in said main housing and pivoted at one end by a pivot thereto, a connecting link having one end pivotally connected to said trigger by a second pivot and the opposing end pivotally connected to one end of said bell crank by a third pivot, a pin mounted on another end of said bell crank, an actuator lever operatively connected to said translating rod and said pin for translating said translating rod in a first direction, a release lever operatively connected to said translating rod to release said translating rod to permit said translating rod to translate opposite said first direction, a hose holder attached to said housing and adapted to support a hose, a fitting holder attached to said translating rod and being oriented to be in line with said hose wherein operation of said trigger causes said translating rod and said fitting holder to position said fitting into said hose, and wherein said first pivot is disposed between said second pivot and said pin whereby said mechanical advantage is enhanced and said insertion tool is operable to insert a fitting into a hose when said hose is disposed in the ground.

3. An insertion tool for inserting a fitting to a hose as claimed in claim 2 wherein said fitting holder is releasably connected to said translating rod including a lever to release said translating rod, a spring biasing said lever to bias said lever to bear on said translating rod and hold it in place, whereby different sized holder can be utilized on said insertion tool to accommodate different sized fittings.

4. An insertion tool for inserting a fitting to a hose as claimed in claim 3 including a knife edge attached to said translating rod adapted to cut away the hose from said fitting upon the translating of said translating rod.

5. An insertion tool for inserting a fitting to a hose as claimed in claim 3 including a hose cutting knife releasably mounted on said translating rod for cutting a hose in order to obtain a particular length of hose.

6. An insertion tool for inserting a fitting to a hose as claimed in claim 5 including a pocket mounted on said main housing for storing said cutting knife.

7. An insertion tool for inserting a fitting to a hose as claimed in claim 5 wherein said cutting knife includes a planar body having opposing cutting edge portions and each of said cutting edge portions being arcuate in shape.

8. In combination, an insertion tool comprising a main housing having a handle and supporting a translating rod for rectilinear movement and being oriented in parallel relationship, a trigger pivotally attached to said handle, a spring between said handle and said trigger biasing said trigger away from said handle, a bell crank mounted in said main housing and pivoted at one end by a pivot thereto, a connecting link having one end pivotally connected to said trigger by a second pivot and the opposing end pivotally connected to one end of said bell crank by a third pivot, a pin mounted on another end of said bell crank, an actuator lever operatively connected to said translating rod and said pin for translating said translating rod in a first direction, said actuator lever having a spring bearing there-against for biasing said actuating lever in a non-operable position, a release lever operatively connected to said translating rod to release said translating lever to permit said translating rod to translate opposite said first direction, said spring bearing against one face of said release lever, another spring bearing on another face opposite said one face on said release lever and biasing it in an operative position, wherein when said release lever is positioned, said other spring is compressed by said release lever so as to permit the translating rod to be repositioned in a direction opposite said first direction, a hose holder attached to said housing and adapted to support a hose, a fitting holder releasably attached to said translating rod and being oriented to be in line with said hose wherein operation of said trigger causes said translating rod and said fitting holder to position said fitting into said hose and said fitting holder being changed to accommodate different shaped and sized fittings, and wherein said first pivot is disposed between said second pivot and said pin whereby said mechanical advantage is enhanced and said insertion tool is operable to insert a fitting into a hose when said hose is disposed in the ground.

9. The combination of claim 8 wherein said hose holder comprises a pair of scissor mounted jaws, a lever operatively connected to said jaws for opening and closing said jaws and locking them in place, a set screw mounted on said handle, a plug mounted adjacent to said handle and connected to said set screw for positioning said plug relative to said handle for changing the opening size of said jaws to accommodate different size hoses.

10. The combination of claim 9 including a fitting holder having a support body and a release lever, a pin for defining a pivot for pivoting said release lever to said support body, a spring biasing said release lever to bias said release lever to bear on an annular slot formed on said translating rod so as to hold it in place, whereby different sized fitting holders can be mounted on said translating rod.

11. The combination of claim 10 including a knife edge attached to said translating rod adapted to cut away the hose from said fitting upon the translating of said translating rod.

12. The combination of claim 11 including a hose cutting knife releasable mounted on said translating rod for cutting a hose in order to obtain a particular length of hose.

13. The combination of claim 12 including a pocket mounted on said main housing for storing said cutting knife.

14. The combination of claim 13 wherein said cutting knife includes a planar hock having opposing cutting edge portions and each of said cutting edge portions being arcuate in shape.

15. The combination of claim 8 including a sleeve supported in said housing for supporting said translation rod and being rotatable, a portion of said sleeve having planar surfaces, a spring having a flat portion adapted to engage said planar surface and hold said sleeve in place so as to change the orientation of said handle whereby said insertion tool is operable in different attitudes.

16. The combination of claim 15 wherein indicia is on said sleeve to allow the end of the hose to be aligned with the indicia during the initial operation of said insertion tool.

* * * * *